(12) United States Patent
Gomez de Llarena (10) Patent No.: US 7,549,753 B2
(45) Date of Patent: Jun. 23, 2009

(54) SYSTEM AND METHOD FOR SELECTIVELY DISPLAYING DATA

(76) Inventor: Carlos J. Gomez de Llarena, 17 W. 54th St., New York, NY (US) 10019

( * ) Notice: Subject to any disclaimer, the term of this patent is extended or adjusted under 35 U.S.C. 154(b) by 526 days.

(21) Appl. No.: 11/188,316

(22) Filed: Jul. 25, 2005

(65) Prior Publication Data
US 2007/0019162 A1 Jan. 25, 2007

(51) Int. Cl.
G03B 21/00 (2006.01)
G03B 21/26 (2006.01)
G06F 15/173 (2006.01)
G06F 15/177 (2006.01)

(52) U.S. Cl. .......................... 353/13; 353/30; 709/225; 709/220

(58) Field of Classification Search .................. 353/13, 353/30; 709/223, 225, 220, 200; 705/27
See application file for complete search history.

(56) References Cited

U.S. PATENT DOCUMENTS 6,597,410 B1 * 7/2003 Doany et al. ................ 348/744
6,804,659 B1 10/2004 Graham et al.
6,826,594 B1 11/2004 Pettersen
2001/0040671 A1 * 11/2001 Metcalf ....................... 353/94

FOREIGN PATENT DOCUMENTS

DE 10130722 A1 * 4/2003
FR 2846106 A3 * 4/2004

* cited by examiner

Primary Examiner—Diane I Lee
Assistant Examiner—Magda Cruz
(74) Attorney, Agent, or Firm—Frommer Lawrence & Haug LLP; Ronald R. Santucci; Thomas F. Presson (57) ABSTRACT

An apparatus and method for selectively displaying data includes an aerial support mechanism, such as a helium balloon, adapted to be positioned at a desired location, which may be changed based on a user preference. The apparatus also includes a processor, coupled to the aerial support mechanism, which accesses, retrieves and stores display data. A projection module is coupled to the processing module and displays portions of the data, as a function of the processor. The projection module displays the portions of the data on a surface such as the ground, side of a building or screen. User-input commands determine the portions of the data displayed by the projection module and the projection module displays different data over a predetermined period of time. Also, a mobile display, mounted on a bus or taxi, can be used to display data based on the location of the mobile display.

5 Claims, 7 Drawing Sheets

SYSTEM AND METHOD FOR SELECTIVELY DISPLAYING DATA

BACKGROUND

1. Field of the Invention

This invention relates generally to a system and method for displaying data specified by a user. More particularly, the present invention relates to a system and method for accessing and displaying data using a mobile display apparatus. The displayed data is accessed as a function of user selections and/or the location of the display apparatus.

2. Background Discussion

Generally, advertisers attempt to reach a maximum number of potential purchasers when displaying advertising material. Many types of media and venues are used to attract potential purchasers, or customers. Some conventional media include, for example, television, radio and billboards. With the advent of the Internet and mobile handheld devices, advertisers are able to selectively target potential customers. Advertisements in the form of pop-up windows, "spam" (i.e., unsolicited and/or unwanted e-mails sent to an email account) and other electronic or Internet transmissions to potential purchasers are common-place.

Furthermore, advertising data can be specifically targeted to a potential customer based on profile data or other known information about a customer's purchasing habits or interests.

For example, one example of Internet advertising is disclosed in U.S. Pat. No. 6,804,659 issued to Graham et al., which relates to an Internet target marketing system for distributing online advertising to viewers based upon the viewers' interests. The system uses an "n-way" matching of users' concepts of interest, advertisers' concepts and concepts contained in a currently viewed document to target advertising to the viewer of the current document. Contextually sensitive advertisement for each page viewed in a browser may be used, thereby associating an advertisement with every page in a document. This method can also include comparing the user concept relevance and the advertiser concept relevance for the document to determine an overall relevance. The advertisement selected can be displayed to a user. This patent is hereby incorporated by reference in its entirety herein.

It is also known in the art that data, such as advertising data, may be inserted into a display device using the Internet. For example, U.S. Pat. No. 6,826,594, issued to Pettersen relates to a method for inserting dynamic content into a web page, using a dynamic content code embedded in the web page. The dynamic content code is used to access a program file on a dynamic content host computer that is run to generate the dynamic content based upon an identification code. The look and behavior of the dynamic content is defined by a plurality of content display attributes that can be modified. The dynamic content can be varied according to a content modification level and can include a run-time modified content. Multiple dynamic contents can be included within a single web page, and one dynamic content code can be embedded in multiple web pages. The dynamic content code can contain potential revenue links, and such links can be dynamically updated.

Thus, while conventional data display apparatus exist, it would be an advancement in the state of the art to have a display apparatus that dynamically displays data as a function of user selections and/or the location of the display apparatus.

BRIEF SUMMARY OF THE INVENTION

The present invention provides a system and method, which may be stored on a computer-readable medium, for displaying data using a display apparatus. More particularly, the present invention relates to accessing and displaying data using either a stationary and/or mobile display apparatus. The displayed data is accessed as a function of user selections and/or the location of the display apparatus.

Accordingly, one embodiment of the present invention is directed to an apparatus for selectively displaying data. The apparatus includes an aerial support mechanism adapted to be positioned at a desired location, which may be changed based on a user preference. The apparatus also includes a data processing module, coupled to the aerial support mechanism, which is adapted to access, retrieve and store data and receive user-input commands. A projection module is coupled to the processing module. The projection module is adapted to display portions of the data, as a function of commands generated by the processing module. The projection module displays the portions of the data on a surface that is relative to the aerial support member. User-input commands determine the portions of the data displayed by the projection module and the projection module displays different data over a predetermined period of time.

Another embodiment of the present invention is directed to an apparatus for providing data. The apparatus includes a support and a processing module, which is coupled to the support. The processing module is adapted to retrieve and store data. A projection module is coupled to the processing module and the projection module is adapted to display portions of the data as a function of commands generated by the processing module.

Yet another embodiment of the present invention is directed to a method for displaying data on a movable vehicle. The method includes accessing first selected data from a storage location. The movable vehicle is positioned at a first location and selected first data is displayed on the movable vehicle when the movable vehicle is located at the first geographic location. Next the vehicle is positioned at a second location and second selected data is accessed as a function of the second location. The second selected data is displayed on the movable vehicle when the movable vehicle is located at the second geographic location.

Yet another embodiment of the present invention is directed to a method for providing data. The method includes accessing data from a movable vehicle while the movable is positioned at a first location. A first selected portion of the data is displayed at a first geographic location. The vehicle is positioned at a second location and a second portion of data is selected as a function of the second location. The second selected portion of the data is displayed at the second geographic location.

Yet another embodiment of the present invention is directed to an archive system that stores text and/or image data that has been displayed and the time and location it was displayed.

Yet another embodiment of the present invention is directed to an interactive gaming system in which a plurality of users, or players, manipulates images, which are displayed on a display apparatus. This embodiment includes a plurality of user devices adapted to transmit data signals, each user device associated with a particular user. A processing module, coupled to each of the plurality of user devices, receives data signals from a particular one or more of the plurality of user devices as a function of the geographic location of the user device. The processing module generates output signals as a function of the received data signals. A display module, or screen, is used to display the output signals.

DETAILED DESCRIPTION OF THE INVENTION

The present invention includes a system for a networked application for remote storing and retrieving of digital information from a database that is delivered to a requesting device such as a mobile display or stationary display for public or private broadcasting.

One embodiment of the present invention includes a device such as a processor, server, or other computer-device, that accesses software and/or a data, for example, from a webpage in which a set of data requested, for example by a form, or template is generated. The software includes processing steps and the data is stored in a depository database. A secondary requesting device, such as another processor, or display device, prompts the database for the stored information and this information is delivered to the secondary requesting device where it is re-processed for display or use.

Input data typically includes information submitted from one or more computing devices, which are able to use virtually any kind of network protocol, for example through wires or wireless communication means, to transport information to another device. Typical devices include, for example computers, mobile phones, personal digital assistants, mobile devices with network capabilities, or any current or future electronic devices with network capabilities. Typical networks include, for example, TCP/IP, IP, UDP, Bluetooth, 802.XX family of wireless networks, IrDA, RFID or any other current or future network protocol.

Devices that provide input typically use input software that acts as an interface between the device and the database. The software contains, for example executable files and scripts that facilitate definition of the structure and the nature of the data, which is being received and prepares it for storage and retrieval. The input software can be accessed over a network, such as the Internet, or any other network of two or more interconnected processing devices, or it can be accessed locally in a processing or storage device, for example, a kiosk. There can be more than one input software at any time in the system acting as interfaces for different devices. Examples of software include, HTML (hyper text markup language) or dynamic webpages with forms, mobile WAP (wireless application protocol) page with forms, kiosk application, text strings sent via email, text strings sent via SMS (short message systems), PC software, and other algorithms that are stored on a computer-readable medium.

The software can be public or private (password protected) and it may have additional functionality besides acting as an interface between a device and a server. Examples of this functionality include, browsing of data, information or promotion of the data stored, community building features, search engine or any other functions designed for an application built with this system.

The information that the system is receiving via the software(s) is typically stored in a database found in a server, which stores data records. Processing of the data, including submission and retrieval is typically performed by software, or stored program code, in the form of queries to the database. The database server is usually accessed over the network (Internet) but it can also be available locally to a device (e.g. kiosk). Examples of storage databases include, for example, SQL, Oracle, Berkley DB, and other storage medium.

Furthermore, the system of the present invention can serve devices requesting data from the database. These client devices access an output software or executable files that allow it to display the retrieved data in a particular format, according to the needs, desires, specifications or inputs of the design. The display of this data can be broadcasted in public, viewed privately, or both depending on the needs, or specifications, of the design. There can be multiple outputs at any time for different devices and displays.

The nature of the data handled by the system of the present invention and stored in the database can vary depending on the needs, or specifications, of the design. Examples of message types include, text, image, photographic, graphic, video, music files, advertising, services, commercial information, local, municipal, state or national information, entertainment, educational information, and other data.

Additional output options can be programmed in the system depending on the specifications of the design. These include provisions on how the data is served, or displayed to the output devices for display. These processes are typically executed on the output device and are generally automated processes that can enhance the relevance or performance of the system. Examples of these options include, location based data delivery, profile or criteria based data delivery, time based or scheduled data, caching of data for later use, device specific data delivery and similar options.

Figure 1:
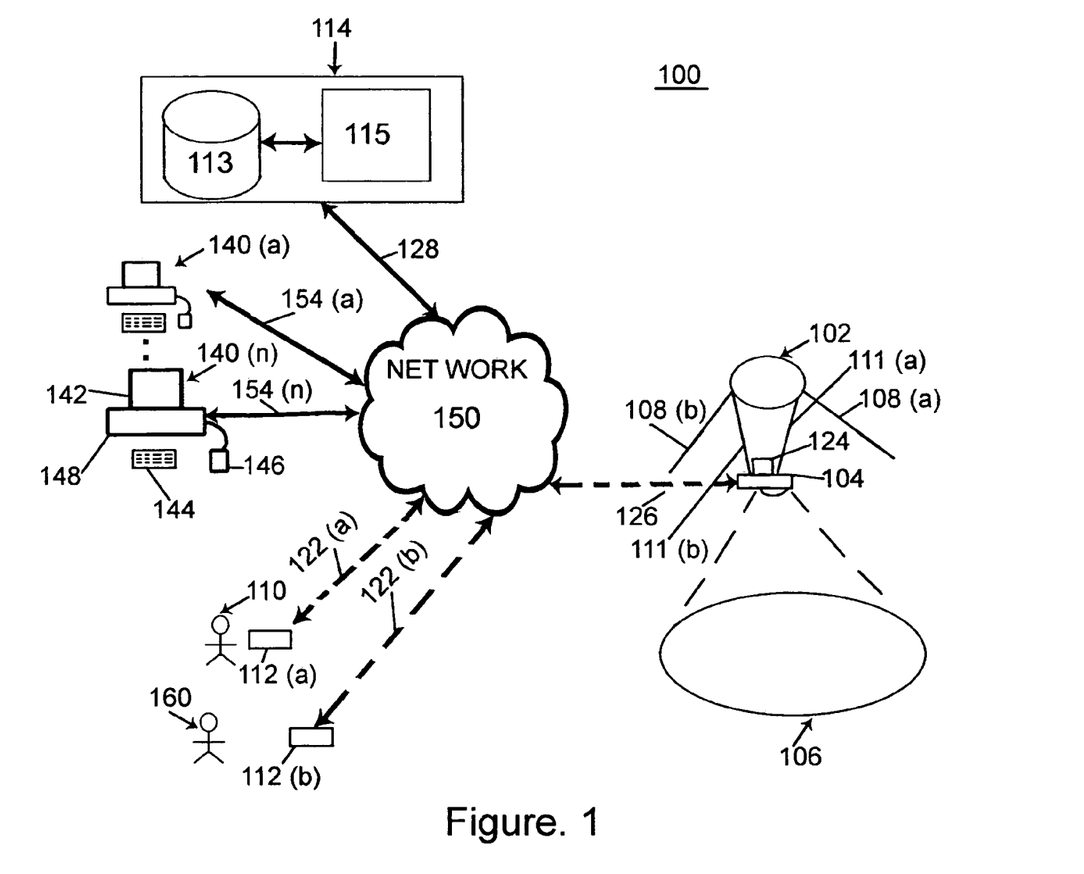
FIG. 1 shows a perspective view of an aerial lift embodiment of the present invention.

FIG. 1 shows a perspective view of an aerial lift embodiment 100 of the present invention. A display device, or projection device, 104 having a processing module 124 is supported by an aerial lift device 102. The display device 104 and processing module 124 are coupled to a network, or the Internet 150, via bi-directional communication means 126. The bi-directional communication means may be, for example, a wireless connection, or network. The processing module 124 typically includes a NIC (network interface card) and utilizes a WAP (wireless application protocol), HTTP (hyper text transfer protocol), FTP (file transfer protocol) or Access Point to transmit and receive data via network 150.

The lift device 102 is for example, a helium balloon, crane, or other apparatus that supports or lifts display device 104 to an elevation such that display device 104 can display data on a surface. The aerial lift device 102 is typically tethered, or controlled via tie-lines 108(*a*) and 108(*b*). While two tie lines are shown, additional tie lines could be used. Tie-lines 108(*a*) and (*b*) can be controlled by one or more people that can move or transport the lift apparatus 102. Alternatively, the tie lines 108(*a*) and (*b*) can be attached or affixed to an object or support structure, to hold the aerial lift device 102 at a location.

The aerial lift apparatus 102 also has support structures 111(a) and 111(b), generally 111, that hold display device 104 and processing device 124. (While two support structures are shown, there could be any suitable number used to maintain the display device 104 in a desired position.) The support structures 111 may be cables, ropes, wood, metal, or other suitable material.

Display device 104 is capable of displaying data, or projecting data, on a surface. The device 104 typically includes a projection module or lens. Processing module 124 is typically a computer with data processing capability and storage or memory. Data that is to be displayed is stored in the memory of the processing module 124 and displayed based on program code executed by processing module 124. The data is displayed on a surface, such as the ground, side of a building or other suitable surface such that it forms a display region 106.

Display device 104 is coupled via bi-directional communication means 126 and network 150 to a server or other storage and/or processing device that is capable of storing and/or processing data, generally referred to as server 114. The server 114 includes memory module 113 and processor 115. The bi-directional communication means 126 is typically a wireless connection to network, or Internet 150. The bi-directional communication means are shown coupled to the network 150; however, the display device 104 could be in direct communication with storage and/or processing device, or server 114. As shown in FIG. 1, server 114 is also coupled to network 150 through bi-directional communication means 128, which is typically a wire or wireless connection (WAP (wireless application protocol)) that enables server 114 to access information from, and provide information to, network 150. The environment 100 also includes a plurality of communication appliances, or user locations, or subscriber devices, or client terminals, 140(a) . . . (n) (where "n" is any suitable number) (collectively referred to herein as, client terminals 140). One or more remote client terminals, represented by terminals 112(a) and 112(b), which are operated by users 110 and 160, respectively, are coupled to network 150 via wireless communication means 122(a) and (b). Wireless communication means 112(a) and (b), generally 112 may be, for example, a wireless network transmission or WAP, as described herein. As shown in FIG. 1, terminals 140(a) . . . (n) are in bi-directional communication with network 150 via communication means 154(a) . . . (n), respectively.

The network 150 is, for example, any combination of linked computers, or processing devices, adapted to transfer and process data. The network 150 may be private Internet Protocol (IP) networks, as well as public IP networks, such as the Internet that can utilize World Wide Web (www) browsing functionality.

Server 114 is operatively connected to network 150, via bi-directional communication channel, or interconnector, 128, which may be for example a serial bus such as IEEE 1394, or other wire or wireless transmission medium. The terms "operatively connected" and "operatively coupled", as used herein, mean that the elements so connected or coupled are adapted to transmit and receive data, or otherwise communicate. The transmission, reception or communication is between the particular elements, and may or may not include other intermediary elements. This connection/coupling may or may not involve additional transmission media or components, and may be within a single module or device or between one or more remote modules or devices.

The server 114 is adapted to transmit data to, and receive data from, client terminals 140 and 112, via the network 150.

Client terminals 112 and 140 are typically computers, or other processing devices such as a desktop computer, laptop computer, personal digital assistant (PDA), wireless handheld device, and the like. They may be capable of processing and storing data themselves or merely capable of accessing processed and stored data from another location (i.e., both thin and fat terminals). These client terminals 112, 140 are operatively connected to network 150, via bi-directional communication channels 122, 154, respectively, which may be for example a serial bus such as IEEE1394, or other wire or wireless transmission medium. Typically, handheld portable devices will access network 150 via a wireless communication medium such as WAP, as described herein.

The server 114 and client terminals 112, 140 typically utilize a network service provider, such as an Internet Service Provider (ISP) or Application Service Provider (ASP) (ISP and ASP are not shown) to access resources of the network 150.

Server 114 is adapted to store and process data related to the present invention and is operatively connected to the network. Server 114 includes a memory 113, processor 115 and related circuits (not shown).

The server memory 113 is adapted to store programs, which include, for example, a web browser as well as typical operating system programs (not shown), input/output programs (not shown), and other programs that facilitate operation of server 114. Web browser is for example an Internet browser program such as Explorer™.

The server memory 113 also stores data tables that store related data, which can be retrieved, processed, updated, modified or otherwise manipulated. The data is typically image data, or text data, or other data that is input by one or more users, or retrieved from a remote location and displayed using display devices as described herein. The data that is to be displayed can be input as a template, or other acceptable format.

The server 114 also includes a processor 115, which is operatively connected to the server memory 113. The processor 115 is used to process and manipulate the data retrieved and stored by server 114. The processor 115 is typically a microprocessor with sufficient speed and processing capacity to adequately performed the desired data manipulations of server 114. The server processor 115 may be, for example, an Intel® Celeron® Processor (Up to 2.60 GHz, 128 KB cache, 400 MHz FSB. The processor 115 may include a plurality of USB (universal serial bus) ports to connect peripherals. Functional circuits (not shown) are operatively connected to the processor 115 and typically include, for example, Integrated Circuits (ICs), ASICs (application specific ICs) power supplies, clock circuits, cache memory and the like, as well as other circuit components that assist in executing the software routines stored in the memory and that facilitate the operation of the server processor 115.

Client terminals, user terminals, or communication appliances are shown as elements 140 and 112. Terminal 140 is typically a desktop computer, laptop computer, PDA (personal digital assistant), wireless handheld device, mobile phone or other device capable of interfacing with a network, such as an IP network. Terminal 140 includes processor 148, support circuitry, memory, input modules 144, 146 and display module 142. Bi-directional interconnection medium 154 operatively connects the terminal 140 to the network 150.

Processor 148, which is operatively connected to the terminal memory, is used to process and manipulate the data retrieved and stored by terminal 140. The processor 148 is typically a microprocessor with sufficient speed and processing capacity. The processor 148, may be similar to the server processor described herein.

The terminal memory stores programs, which include, for example, a web browser as well as typical operating system programs (not shown), input/output programs (not shown), and other programs that facilitate operation of terminal 140. The web browser is for example an Internet browser program such as EXPLORER®.

The terminal memory may also store data, which can be retrieved, processed, updated, modified or otherwise manipulated. Data is adapted to store data that is presented using a display device as described herein. Users can input the data image or text data using a template, or form, or input screen, displayed on an interface.

The terminal memory also includes storage areas, or memory locations, such as RAM (Random Access Memory), ROM (Read Only Memory), PROM (Programmable ROM), EEPROM (Electronically Erasable PROM) or other suitable electronic storage medium, which are adapted to store input data to be displayed. This data may be provided by a user as input into a template or form, or screen, or series of questions, or statements, or image data input means, such as uploading an image data file, or photographs. The data may also be retrieved by the client terminal 140 from a remote location.

Input modules 144 and 146 are, for example, a keyboard, mouse, touch pad, menu having soft-keys or other input facility adapted to provide input to terminal 140.

Display module 142 is, for example, a monitor, LCD (liquid crystal display) display, GUI (graphical user interface) of other interface facility that is adapted to provide or display information to a user.

Figure 2:
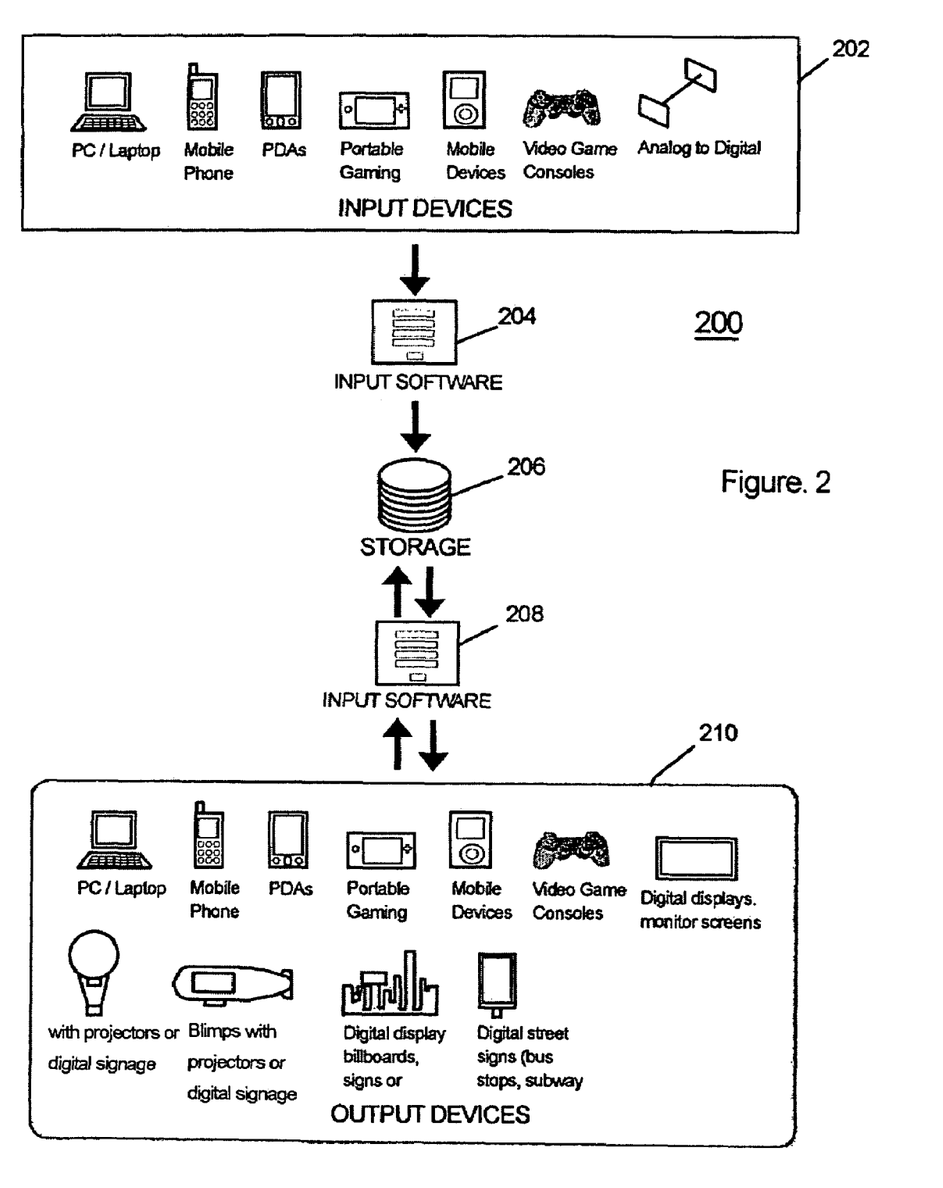
FIG. 2 illustrates examples of components used to implement the present invention.

FIG. 2 illustrates components 200 used to implement the present invention. These components show that a plurality of input devices, generally 202, are used to access input software 204. The input devices include, for example a personal computer (PC) (lap top or desktop), mobile phones, personal digital assistants (PDAs), mobile devices, video game consoles and analog-to-digital converter devices. The input software 204 is typically a series of steps, program, algorithm, program code or executable instructions that may be stored on a computer-readable medium and may be used to format input data, such as text data, image data, digital data, analog data, or other types of data and place the data in storage medium 206. Output software 208 is typically a series of steps, program, algorithm, program code or executable instructions that may be stored on a computer-readable medium and may be used to access, manipulate and process the stored data, which is stored in memory 206. The output software 208 may also access and retrieve data stored in another storage location, such as a remote storage medium. Element 210 shows a plurality of output devices that may be used to display or output the data. Output devices include for example, a PC, mobile phone, PDA, portable game display digital displays, inflatable lifts, blimps, billboards and street signs having a display means, such as an interface, LCD (liquid crystal display) CRT (cathode ray tube) screen or other display means.

Figure 3:
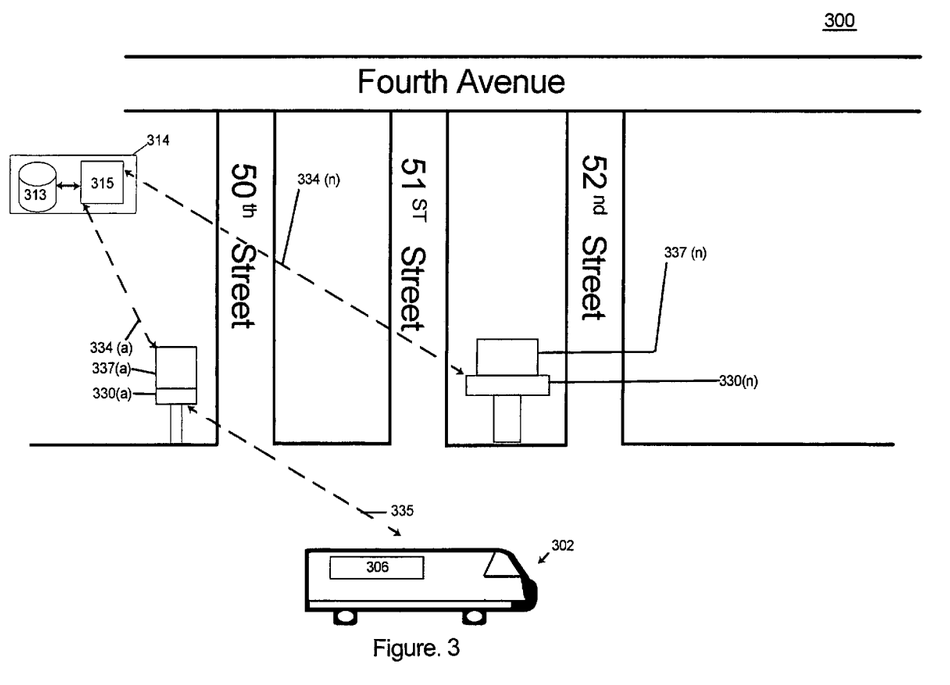
FIG. 3 shows a perspective view of an embodiment of the present invention that utilizes a moving vehicle.

FIG. 3 shows a perspective view 300 of an embodiment of the present invention that utilizes a moving vehicle. Moving vehicle 302, which may be, for example, a bus, taxicab, mobile phone or other movable or portable apparatus. The vehicle 302 has a display device 306 that receives data from data processing devices 330(*a*) . . . (*n*) (where n is any suitable number). The processing devices, generally, 330 are typically processing modules that have data processing and storage capability. The processing devices 330 may be disposed throughout an area, such as a city, or portion of a city, or rural region. The processing devices 330 can receive data from a device 314, which is typically a server or other module that can store data to be displayed. Device 314 typically includes a memory 313 and processor 315. Processing devices 330 can also transmit data and display data, such as advertising data, weather data or other data that has been transmitted to processing devices 330 for display, using an associated display module 337, or re-transmitted to another display device, such as a mobile display, for example, on a bus, taxi, mobile phone, PDA, laptop or other suitable display device, via communication means 335, which may be a wireless transmission. The processing devices 330 are in bi-directional communication with server device 332, via communication means 334(*a*) . . . (*n*), respectively. These communication means, generally, 334 are typically wireless transmission medium that can transmit text and image data to processing devices 330.

As vehicle 302 moves along a street 340, or other path, road or area, the vehicle 302 receives data from processing devices 330. Thus, as the location of the vehicle 302 changes, it will display various data on display 306 as a function of data received from processing devices 330(*a*) . . . (*n*). For example, as mobile display unit, shown as bus 302, travels on road 340, the mobile display unit 302 may display data transmitted from 330(*a*) and when the bus is in proximity to processing device 330(*n*), display data transmitted from processing device 330(*n*). Thus as a bus travels throughout a city or other area, the information displayed on display module 306 will change based on the location of the bus relative to a processing device 330.

It is also an embodiment of the present invention that the data may be displayed on a sign or other stationary object that has a display device or interface or display means. For example processing devices 330, as well as transmitting data to a moving vehicle can also display data on a display apparatus 337 coupled to, or mounted on, the processing device 330.

Figure 4:
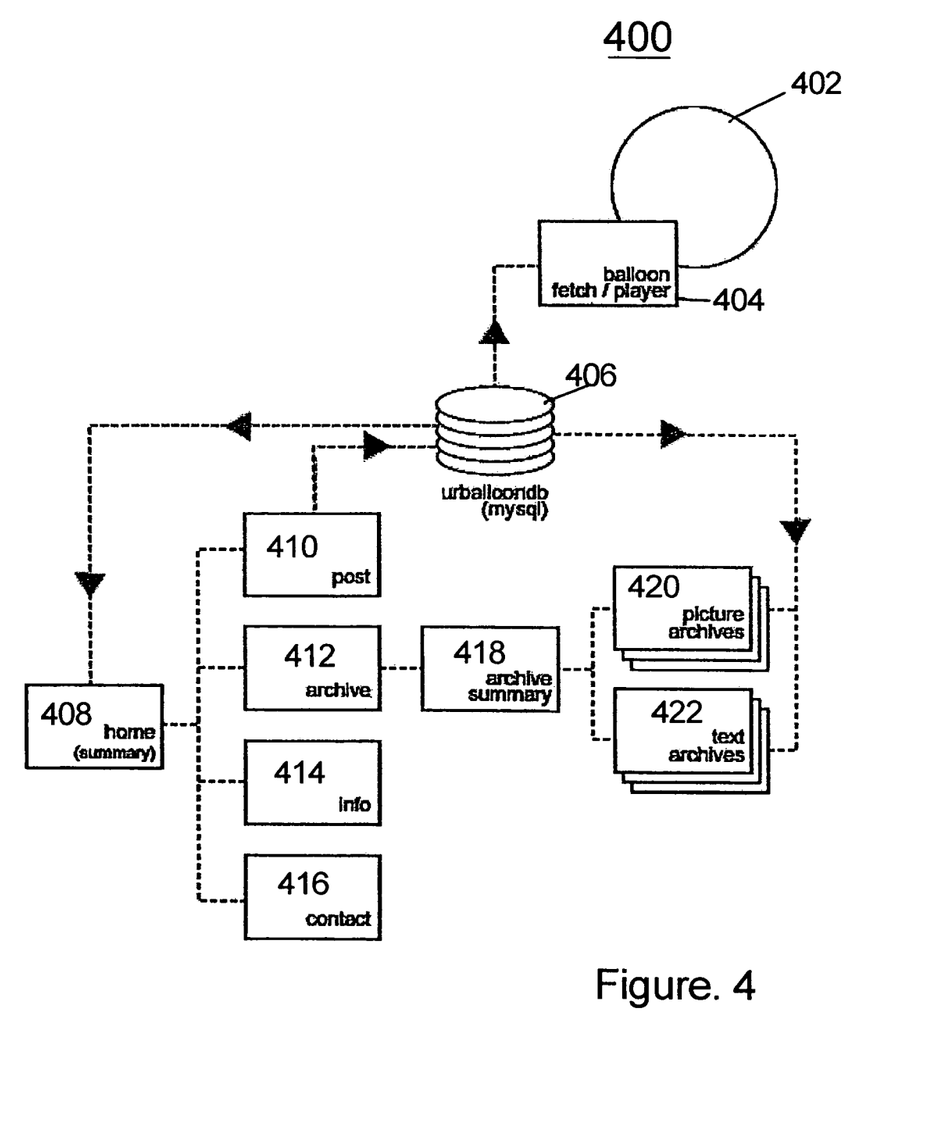
FIG. 4 shows examples of some of the components of the present invention.

FIG. 4 shows components 400 of the present invention. The components include a website 408, which is typically accessed from the Internet or other public or private network. The website is adapted to transmit and receive data with database 406, which is coupled to a display device 404. The display device 404 can be supported or mounted on a support or lift member 402. The display device 404 displays data stored in database 406. This data may have originated from website 408, or retrieved from another location.

As shown in FIG. 4, website 408 is also coupled to a post module 410, an archive module 412, an information module 414 and a contact module 416. Theses modules are, for example, dedicated memory or storage locations (such as, RAM, ROM, PROM or EEPROM). These locations may be located on the terminal devices and/or server devices, as described herein.

Post module 410 is adapted to receive and provide data as a posting to viewers who wish to view data that is or has been displayed. The data may be designated to be displayed on a particular display device such as on aerial lift, moving display or stationary display as described herein.

Archive module 412 is adapted to archive, or store data that was displayed on one or more display devices 404 as described herein. The archive module 412 is coupled to a second archive module 418, which provides a storage location for previously displayed data, or data that has yet to be displayed or data that has previously been displayed and may be displayed again. This feature is particularly useful when advertising data is to be displayed more than once. The second archive module 418 is coupled to picture archive module 420 and text archive module 422. These modules are adapted to store particular types of data.

Information module 414 provides and displays additional information such as information related to a source, provider or individual who has provided information to the website 408 and/or database 404. This may include name data, address data, mailing data and/or electronic address data, such as an e-mail address, website or other electronic or non-electronic contact information.

Contact module 416 is adapted to obtain and store information related to a source of data. This enables an individual, who provided data that is to be displayed, or that was displayed, to be contacted by individuals who viewed the displayed data. This is particularly advantageous when a supplier has advertised a product or service and people are interested in contacting the provider to initiate a transaction. This may include name data, address data, mailing data and/or electronic address data, such as an e-mail address, website or other electronic or non-electronic contact information. This may also include transmitting and receiving information utilizing the network, as shown in FIG. 1, herein.

As shown in FIG. 4, the various modules are also coupled to database 406 such that data and other information, such as contact information and archived information may be shared between the modules described herein, and the website 408 and the database 406.

Figure 5A:
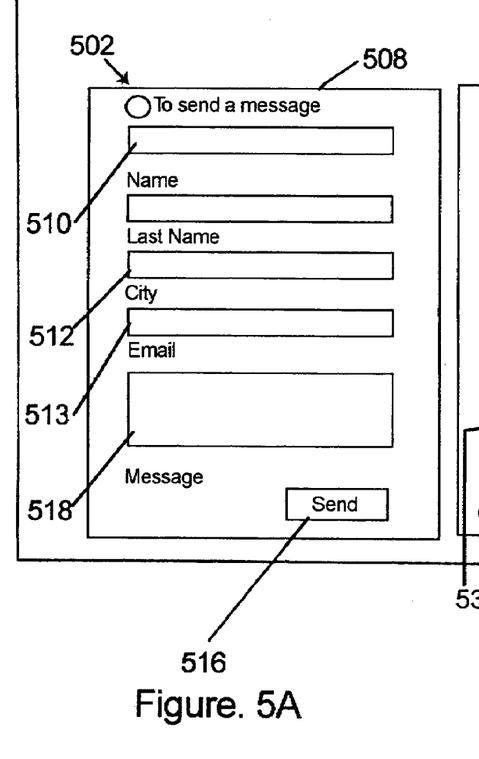
FIGS. 5A and 5B illustrate user interfaces to input text and image data that is to be displayed.
Figure 5B:
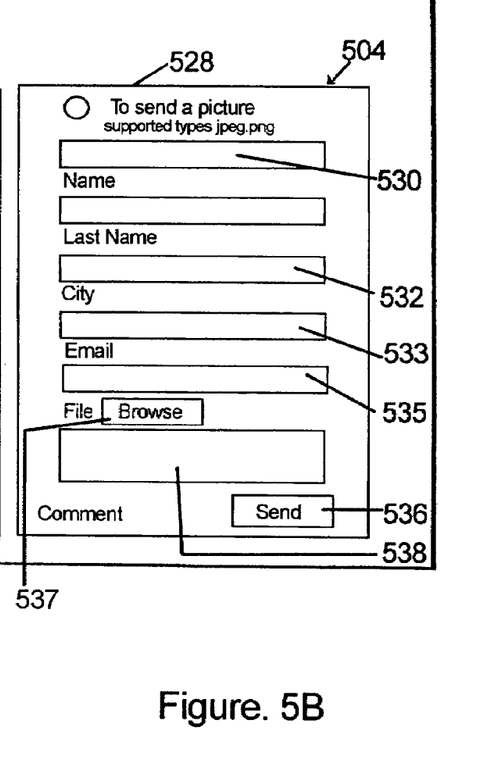

FIGS. 5A and 5B illustrate user interfaces adapted to input text and image data, respectively. FIG. 5A shows an interface 502, which is typically accessed via a website, that enables a user to provide text messages or text data by inputting the data. The interface 502 has various portions or data fields for inputting and storing associated data. Portion 508 enables a user to specify that they wish to send a message. Portions 510 and 512 enable a user to supply a name and address. Portion 513 enables a user to input an email address. Portion 518 enables a user to input the text message that they would like to have displayed. Button 516 allows the user to submit the text message.

Similarly, FIG. 5B shows an interface 504, which is also typically accessed via a website, that enables a user to provide image data by inputting the data. Portion 528 enables a user to specify that they wish to send a message, such as text or image or advertisement data. Portions 530 and 532 enable a user to supply a name and address. Portion 533 enables a user to specify an email address. Portion 538 enables a user to input the image data that they would like to have displayed. Button 536 allows the user to submit the image data.

Figure 6:
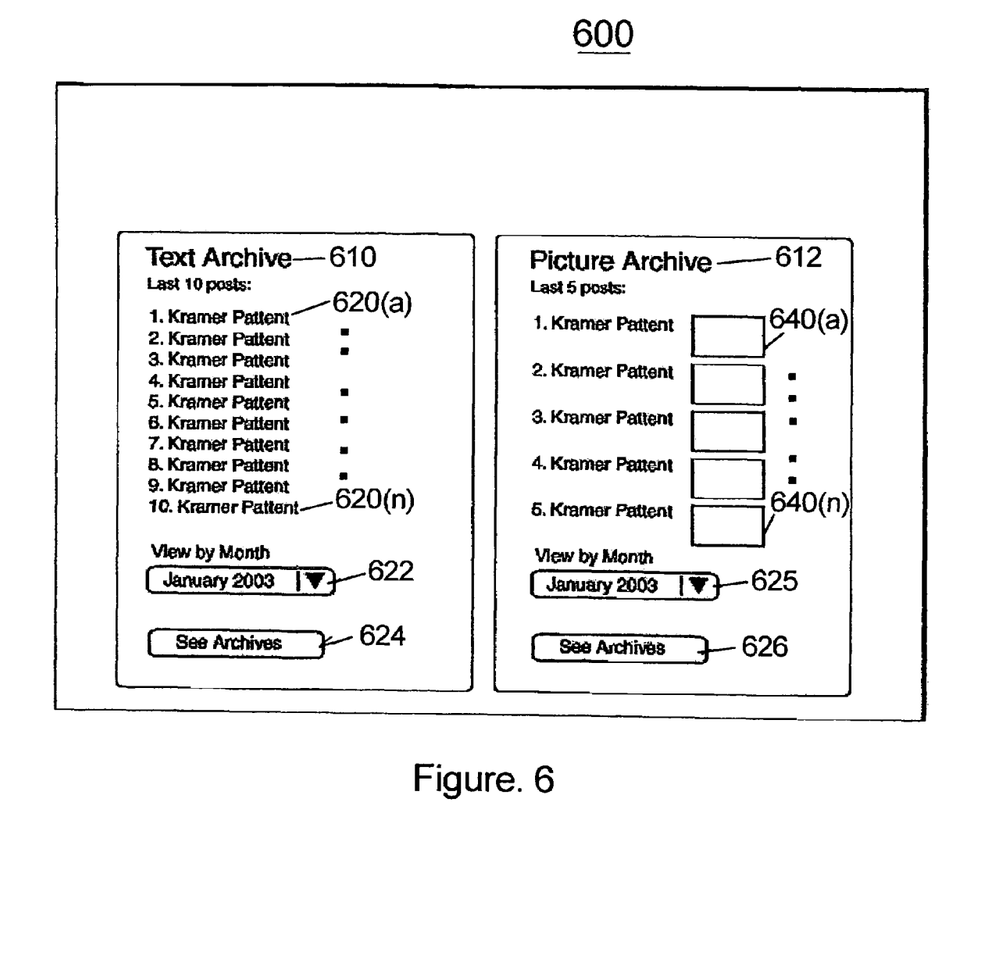
FIG. 6 shows a display of data selected for a particular device.

FIG. 6 shows a display 600 of data selected for a particular device. Display 600 is typically provided on a website that may be accessed by a network, such as the Internet. Portion 610 provides a heading indicating that the text archive can be displayed. Portion 612 provides a heading indicating that the picture archive can be displayed. Elements 620(a) . . . (n) show that the previous "n" text items can be accessed. Button 622 shows that a monthly viewing criteria can be accessed and button 624 shows that text archives can be accessed. Also, another feature of this display is that it can provide data related to a location where the data was displayed previously.

Similar to the text, image data can also be displayed and accessed. Portion 612 provides a heading indicating that the picture archive can be displayed. Elements 640(a) . . . (n) show that the previous "n" image items can be accessed. Button 625 shows that a monthly viewing criteria can be accessed and button 626 shows that image archives can be accessed.

Figure 7:
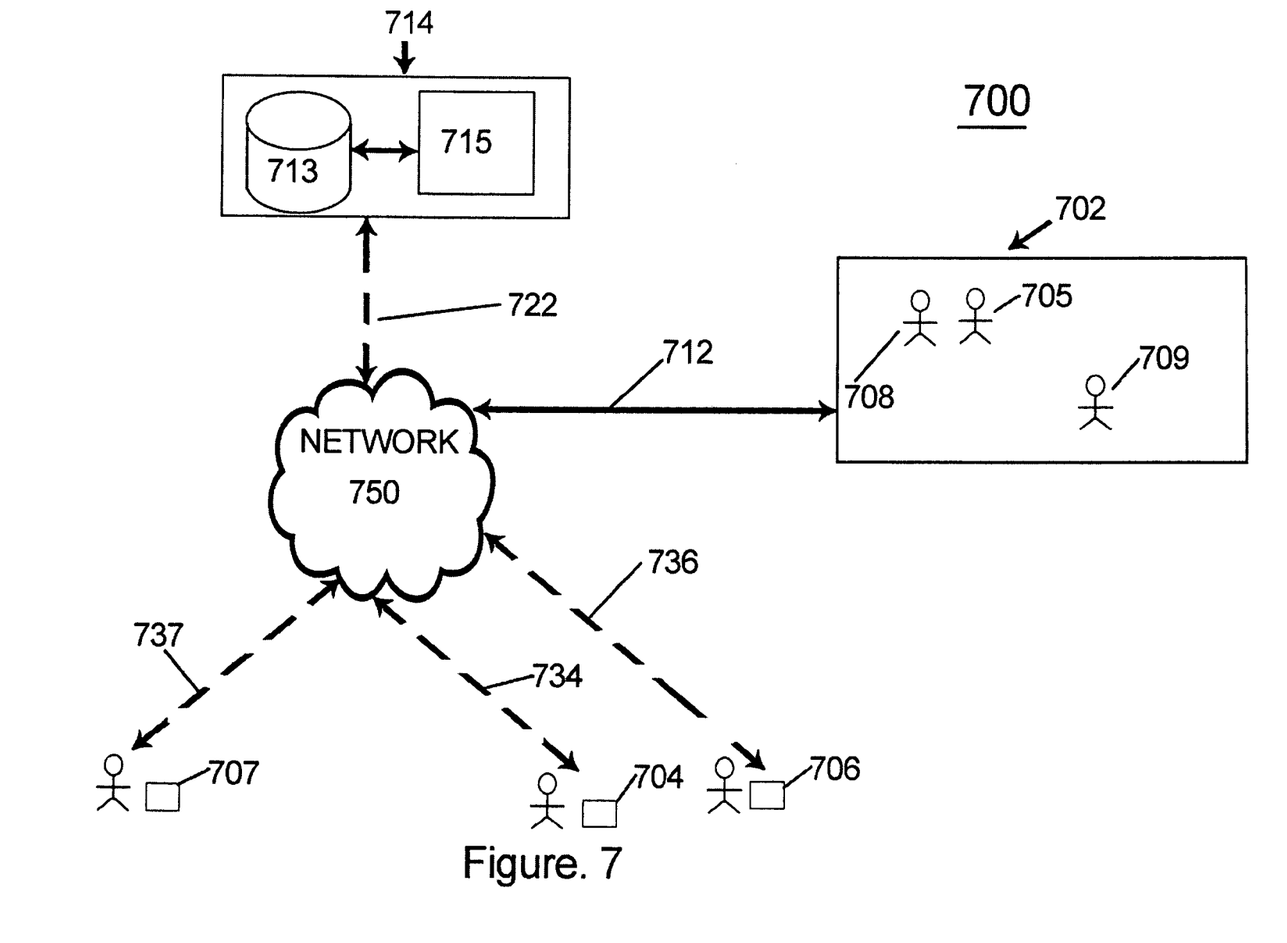
FIG. 7 shows an interactive game embodiment of the present invention.

FIG. 7 shows an interactive game embodiment 700 of the present invention. Display 702 is coupled to a network 750, such as the Internet or other public or private network of inter-connected processing and/or storage devices (as described herein), via bi-directional communication means 712, which are typically wireless communication (as described herein). The network 750 is coupled to server 714, which includes a memory 713 and a processing module 715. Server 714 is coupled to network 750 via bi-directional communication means 722, which may be a wireless or wired connection, as described herein. Various user devices 704, 706 and 707 are also coupled to the server 714, via bi-directional communication means 734, 736 and 737, respectively. The user devices 704, 706 and 707 may be for example, client terminals, portable handheld devices such as PDAs (personal digital assistants), mobile phones, or other user-device capable of receiving and/or transmitting data to network 750. The display data shown on display device 702 is a function of the input from the user devices or communication appliances 704, 706 and 707. The data is displayed as images, or icons, or data representations 705, 708 and 709. The users' selections, made by utilizing devices 704, 706 and 707, control the display data of 702. For example, a user may be playing a video game or other interactive session and the position or input from each user 704, 706 707, is a component of the image display 702.

When a user device (shown as 704, 706 707 in FIG. 7) is within a predefined proximity, such as 100 yards, the user will be able to input data that will be displayed on display module 702, which may be for example, an LCD device, CRT terminal, plasma screen, or other suitable data display means. Thus, users can play games, using associated user devices that are displayed on display 702, when the player or user is within the predefined distance. As shown in FIG. 7, when a user is within a predetermined distance, or proximity to display device 702, they may transmit signals to activate a corresponding icon or image and thus "play" or participate in the session displayed on display device 702. While the present invention is directed to allowing users to participate or play when they are within the predetermined distance relative to display 702, it is also an embodiment of the present invention that the ability for a user to participate is not limited to a particular distance from display 702. Indeed, a host, or sponsor, may maintain or control the session from a central, or remote location. Alternatively, remote users (not shown) may be allowed to participate without being located within a predetermined proximity. These remote users typically have authorization, or are permitted access to participate from alternate locations that may be within the predefined distance or outside the predefined distance.

Thus, an embodiment of the present invention includes a display system that includes a plurality of user devices adapted to transmit data signals, each user device associated with a particular user. A processing module is coupled to each of the plurality of user devices, adapted to receive data signals from a particular one or more of the plurality of user devices as a function of the geographic location of the user device. The processing module generates output signals as a function of the received data signals. A display module, coupled to the processing module, is adapted to display the output signals.

Thus, while fundamental novel features of the invention shown and described and pointed out, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in another form or embodiment. It is the intention, therefore, to be limited only as indicated by the scope of the claims appended hereto.

What is claimed is:

1. An apparatus for selectively displaying data comprising:
   a helium inflated lift device adapted to support a display device to be positioned at a desired location;
   a data processing module, coupled to the helium inflated lift device, the processing module adapted to access and store data and receive user-input commands from one or more electronic user communication devices through one or more communication networks;
   a projection module, coupled to the processing module, the projection module adapted to display portions of the data, as a function of commands generated by the processing module, on a surface that is relative to the helium inflated lift device; and
   an archive module, coupled to the processing module and projection module, the archive module adapted to archive and or store data that was displayed by the projection module to facilitate future displays by the projection module,
   wherein the user-input commands determine the portions of the data displayed by the projection module and the projection module displays the portions of data such that different data is displayed over a predetermined period of time.

2. The apparatus according to claim 1, wherein the data includes image data.

3. The apparatus according to claim 1, wherein the data includes video data.

4. An apparatus for providing data comprising:
   a helium inflated lift device adapted to support a display device;
   a server coupled to the helium inflated device and one or more communication networks, further comprising
      a processing module is adapted to retrieve and store data comprising one or more user preferences received from one or more electronic communication devices, wherein the processing module generates position data adapted to reposition the helium inflated lift device, and provides contact information upon request to one more electronic communication user devices through a communication network in relation to data received by the processing module,
      one or more databases coupled to the processing module for storage and retrieval of data provided by electronic communication devices; and
   a projection module, coupled to the processing module, the projection module adapted to display portions of the data as a function of commands generated by the processing module.

5. A display system comprising:
   a plurality of electronic communication user devices adapted to transmit data signals, each user device associated with a particular user;
   a processing module, coupled to each of the plurality of user devices through one or more communication networks, the processing module adapted to receive data signals from a particular one or more of the plurality of user devices as a function of the geographic location of the lift device and the proximity of the one or more of the user devices to the lift device, the processing module adapted to generate output signals as a function of the received data signals; and
   a display module, coupled to the processing module, adapted to display the output signals.

* * * * *